PRODUCTION OF MOLDING COMPOSITIONS FROM UREA-FORMALDEHYDE AND CELLULOSE CONTAINING MATERIAL
Filed Sept. 6, 1951
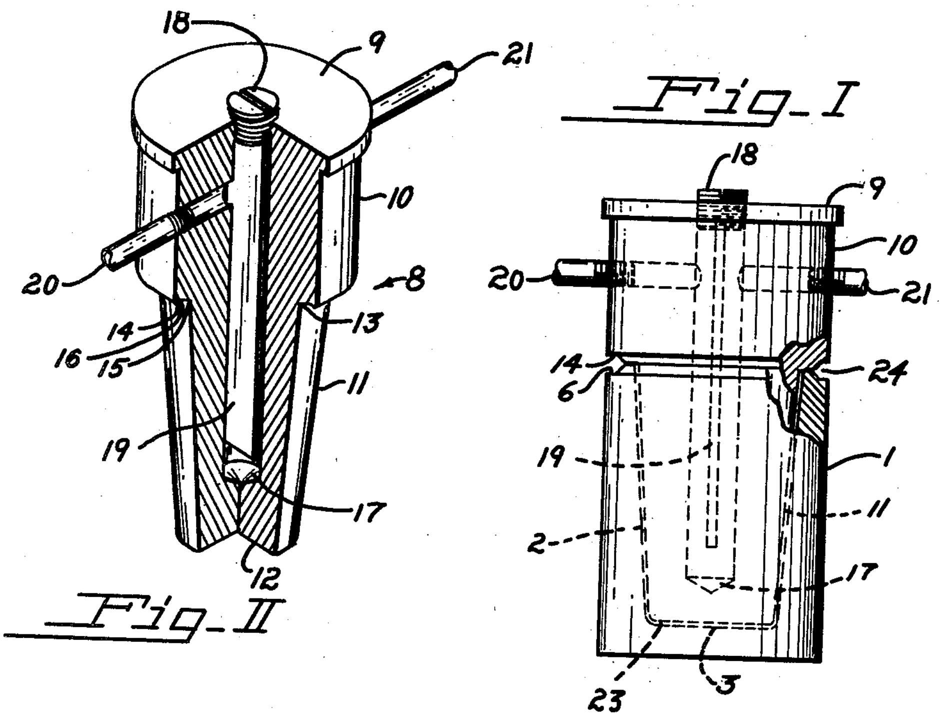
Fig_II Fig_I
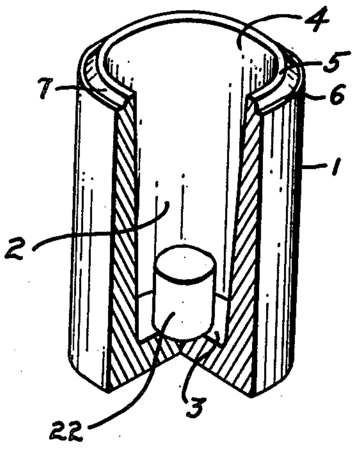
Fig_III
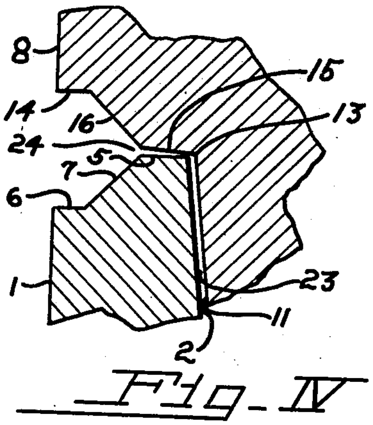
Fig_IV
Inventors
KENNETH D. MEISER
ANDREW W. KASSAY
By Marshall and Marshall
Attorneys Patented May 25, 1954

2,679,490

UNITED STATES PATENT OFFICE 2,679,490

PRODUCTION OF MOLDING COMPOSITIONS FROM UREA-FORMALDEHYDE AND CELLULOSE CONTAINING MATERIAL

Kenneth D. Meiser and Andrew W. Kassay, Toledo, Ohio, assignors, by mesne assignments, to Allied Chemical & Dye Corporation, New York, N. Y., a corporation of New York Application September 6, 1951, Serial No. 245,366

6 Claims. (Cl. 260—17.3)

1

This invention relates to the production of urea-formaldehyde molding compositions by a method that is more economical and efficient than the methods heretofore used.

Urea-formaldehyde reaction products are used principally for making compositions of two different types: adhesives and molding compositions. Urea-formaldehyde adhesives have been much more economical to manufacture heretofore than urea-formaldehyde molding compositions. In the manufacture of an adhesive, a urea-formaldehyde reaction product is heated in aqueous solution to cause the molecules of the reaction product to condense together, water being split off in the condensation reaction. This reaction is carried to an advanced stage in the aqueous solution so that the molecules of the resulting condensation product are relatively large and the solution has the high viscosity and tackiness that are desirable in an adhesive. The resulting solution can be spray-dried to obtain the condensation product in the form of a powder which is convenient to ship or to store and which can be dissolved in water to re-form the adhesive solution.

It has been found that the material obtained by spray-drying such a solution is not suitable for use as a molding composition because the material does not flow properly under commercially usable molding pressures, and because articles molded from the material have very unsatisfactory water resistance. The poor water resistance of articles molded from such a material is due to the fact that the material has been condensed to an advanced stage in an aqueous solution.

It has been found that in order to produce a commercially usable urea-formaldehyde molding composition it is necessary to employ a urea-formaldehyde reaction product that has not been condensed to an advanced stage in an aqueous solution. In the production of such a molding composition an aqueous solution of a urea-formaldehyde reaction product that has been condensed only very slightly is used to impregnate a cellulose filler and the impregnated filler is then dried. In that manner, the condensation of the urea-formaldehyde reaction product takes place to only a slight extent in the aqueous solution, and most of the condensation occurs during the drying operation while the reaction product is carried on the cellulose filler. The drying of such an impregnated filler has been carried out heretofore by passing the filler through a heated oven on a conveyor. The resulting dried impregnated filler resembles pop corn, and must be ground to a fine powder in order to produce a molding composition that gives homogeneous molded articles. During the grinding operation it is necessary to add modifiers such as mold lubricants and pigments. It is the necessity for using the operations of impregnating, oven drying, and grinding with additional ingredients that has made the production of urea-formaldehyde molding compositions more expensive heretofore than the production of urea-formaldehyde adhesives.

2

The principal object of the invention is the production of urea-formaldehyde molding compositions by a more economical method. More specific objects and advantages are apparent from the following description, which merely discloses and illustrates and is not intended to limit the scope of the invention.

A urea-formaldehyde reaction product that has been condensed to an advanced stage in an aqueous solution is quite stable and has a relatively high melting or softening point. Thus, an aqueous solution containing such a urea-formaldehyde reaction product can be spray-dried without difficulty. During the spray-drying of such a solution, the highly condensed reaction product solidifies readily in the drier and does not remain tacky or adhere to the outlet ducts. Moreover, because of its stability, the highly condensed reaction product remains substantially unchanged during the spray-drying operation, so that there is no appreciable difference between the solution that enters the spray-drier and the solution that is obtained by redissolving the spray-dried product in the same proportion of water.

In contrast, a urea-formaldehyde reaction product that has been condensed only very slightly in an aqueous solution, of the type used for impregnating a cellulose filler in the production of a urea-formaldehyde molding composition, has a very low fusion point. Attempts to spray-dry an aqueous solution of a slightly condensed urea-formaldehyde reaction product heretofore have resulted in failure because the product has been too tacky and gummy to be carried by the air stream through the outlet duct of a spray-drier.

The present invention is based upon the discovery that there is a narrow critical range of conditions under which a urea-formaldehyde molding composition that flows well under ordinary molding pressures and produces molded articles of commercially acceptable water resistance can be produced by spray-drying. The present invention is believed to be the first instance of the successful production of a urea-formaldehyde molding composition by spray-drying.

Although the production of powdered urea-formaldehyde adhesives by spray-drying is very common, it has been believed to be impossible heretofore to produce a satisfactory urea-formaldehyde molding composition by spray-drying. Heretofore, it has been believed to be necessary to carry the reaction of urea and formaldehyde to an advanced stage of condensation in aqueous solution in order to produce a product having a high enough fusion point to be spray-dried. The resulting spray-dried materials were satisfactory for use as adhesives but were not suitable for use as molding compositions because they did not flow properly in the mold and produced articles having insufficient water resistance.

The present invention is based upon the discovery that an excellent molding composition can be produced by spray-drying, at a certain specific pH, an aqueous suspension containing a certain specific proportion of a finely divided cellulose filler and containing a reaction product of formaldehyde and urea that has been condensed to only a specific stage. Heretofore, in the production of a urea-formaldehyde molding composition, condensation of a urea-formaldehyde reaction product has been carried to an advanced stage on a cellulose filler by a prolonged oven-drying or baking operation. The surprising discovery has now been made that in the practice of the present invention, by the use of a specific pH, the condensation of the specific urea-formaldehyde reaction product used, in the presence of a specific proportion of a finely divided cellulose filler, can be carried to an advanced stage during a spray-drying operation to produce an excellent molding composition. It has been discovered that such a urea-formaldehyde reaction product is very reactive under these conditions so that the product of the spray-drying operation is condensed to an advanced stage and can be recovered readily because it is not tacky or gummy.

The presence of a specific proportion of a finely divided cellulose filler in the suspension that is spray-dried in the practice of the present invention is very critical, because if such proportion of a finely-divided cellulose filler were not present in the suspension, an attempt to spray-dry would produce only a worthless gummy mass.

Another critical limitation of the suspension that is spray-dried in the present process is that it contains a urea-formaldehyde reaction product that has been condensed only to a specific stage in the aqueous solution. The stage to which such urea-formaldehyde reaction product has been condensed is best measured by a standardized test carried out on the spray-dried material. The purpose of this test is to distinguish such reaction product from the more highly condensed urea-formaldehyde reaction products heretofore used in spray-drying operations. This test shows the reaction product in the suspension to be condensed to the proper stage if the molding composition has a flow time of not more than 20 seconds under a pressure of 7,000 pounds per square inch in a cup mold heated by steam under 60 pounds gauge pressure. The cup mold used in this test is shown in the accompanying drawing.

Figure I of the drawing is a view in elevation of a die assembly of the type used in the flow test.

Figure II of the drawing is a half-sectional view in perspective of the die punch portion of the die assembly.

Figure III of the drawing is a half-sectional view in perspective of the die cavity portion of the die assembly.

Figure IV of the drawing is an enlarged fragmentary cross-sectional view of the angular point of juncture of the die punch portion and the die cavity portion of the die assembly.

The die assembly used in the test is a steel mold which produces an ordinary drinking tumbler. A lower die cavity portion 1 of the die assembly has a height of 4.5 inches and an outside diameter of 3.501∓.0005 inches and contains a tapered die cavity 2 having a mouth 2.850 inches in diameter, a bottom 3 2.000 inches in diameter and a depth of 4.000 inches. The tapered walls of the cavity 2 are joined with the bottom 3 by means of a fillet having a 3/16 inch radius, which provides a smooth rounded corner around the bottom 3 of the cavity 2. The 2.000 inch diameter of the bottom 3 is measured at the point where the 3/16 inch radius fillet joins the tapered walls. The mouth of the cavity 2 is formed by a raised land 4 having an upper edge 5 that is 0.125 inch in width; the inside diameter of the upper edge 5 is 2.850 inches and the outside diameter is 3.100 inches. The upper edge 5 joins an outer shelf 6 by means of a slope 7 cut at a 45° angle to the edge 5. The shelf 6 is 1/8 inch below the upper edge 5, measured on a line perpendicular to the shelf 6 and the edge 5.

A die punch 8 comprises a top 9, an upper portion 10 and a lower tapered portion 11. The top 9 is 3.750 inches in diameter and has a height of 1/4 inch; the upper portion 10 is 3.5005∓.0005 inch in diameter and has a height of 2 1/8 inches; the lower tapered portion 11 is 2.750 inches in diameter at its top and 1.900 inches in diameter at its bottom 12, and has a height of 3.950 inches. The intersection of the walls of the lower portion 11 with the bottom 12 is rounded with a 3/16 inch radius which provides a smooth corner around the bottom 12 of the die punch 8. The 1.900 inch diameter of the bottom 12 is measured at the point where the 3/16 inch radius joins the tapered portion walls. The walls of the lower tapered portion 11 extend from a point 13 that is 1/8 inch below a shelf 14, measured on a line perpendicular to the shelf 14. A land 15, .175 inch wide, extends on a 1/2° slope from the point 13 to a face 16, which is cut at an angle of 45° to the shelf 14.

Extending along the axis of the die punch 8 is a drilled hole 17 23/32 inch in diameter and about 5 3/4 inches in depth, which is stoppered at the top with a brass plug 18 3/4 inch in diameter and 9/16 inch in height. Extending from a point 9/16 inch from the top of the plug 18 is a baffle 19 5 1/4 inches in height, 1/16 inch thick and 7/8 inch wide. A 3/8 inch diameter steam pipe 20 is screwed in one side of a 9/16 inch diameter drilled hole extending across the upper portion of the die punch 8 and a similar steam pipe 21 is screwed in the other side of the drilled hole.

When the die punch 8 is inserted into the die cavity 2, the sides and bottoms of the die punch 8 and die cavity 2 are separated by a space 23, .050 inch in width. The upper edge 5 of the raised land 4 forms an angular point of juncture 24 with the land 15 of the die punch 8.

Before performing the flow test which must be met by a molding composition of the invention, the hydraulic press which operates the die punch is closed for at least one full minute while the closed die assembly is heated with steam under 60 pounds gauge pressure. The sample of the composition should be a representative sample and should be at or near room temperature. The weight of the sample employed should be about 10 per cent in excess of the final weight of the cup. Thus, about 45 grams of sample is required if the final cup weighs 41 grams. The sample is pilled in a standard pilling press, using a 2¼ inch diameter die. The die assembly is opened and the pilled sample 22 is placed in the die cavity 2 (Figure III). The steam which heats the die cavity 2 enters the die punch under 60 pounds gauge pressure and flows around the baffle 19, heating the die cavity 2 to approximately 302 degrees F. The exhaust steam leaves the die punch at a temperature of approximately 310 degrees F. The pressure exerted on the composition when the mold is closed should be 7,000 pounds per square inch. The punch, coming down on the pilled sample as the mold is closed, forces it to flow in a thin stream around the die cavity 2 in the space 23 between the punch and the cavity. The excess molding composition, i. e., the flash, escapes at the angle 24 formed at the point of juncture of the lands of the die cavity 2 and the die punch 8 (Figure IV). At the instant when the press closes, i. e., at the instant when a pressure gauge attached to the cylinder used to close the press shows full line pressure in such cylinder, the timing of the flow is started and is continued until movement of the flash at the angle 24 is observed to cease. The requirement which is met by molding compositions of the invention is that under these conditions, the time of flow is not more than 20 seconds (and preferably is from 5 to 15 seconds).

UREA-FORMALDEHYDE REACTION PRODUCT

The urea-formaldehyde reaction product in an aqueous suspension that is spray-dried to produce a molding composition in accordance with the present method is obtained by reacting urea with formaldehyde in aqueous solution.

In general, the proportion of formaldehyde actually reacted with urea may range from one to two mols per mol of urea, but preferably is from 1.2 to 1.9 mols per mol of urea, and most desirably is from 1.4 to 1.8 mols per mol of urea. It is desirable to use a slight excess of formaldehyde over the proportion desired in the product, since some formaldehyde ordinarily is lost during the reaction. For example, the proportion of formaldehyde used may range from 1.1 to 2.1 mols per mol of urea.

The success of the present method is based upon carrying out the reaction between the urea and formaldehyde in such a manner that condensation takes place to only a limited degree. That is, it is essential that the reaction be carried only to the point where the resulting product is still very reactive, the condensation then being carried to an advanced stage during the spray-drying operation. When a high ratio of formaldehyde to urea is used, e. g., 2.0 mols of formaldehyde to 1 mol of urea, the reaction is easy to control, but difficult to carry sufficiently far. Using such a ratio, the reaction may be continued until a cloudy solution is obtained, and the reaction goes too slowly unless a relatively high temperature is used. However, when a low ratio of formaldehyde to urea is used, e. g., one mol per mol of urea, carrying the reaction to the point of cloudiness results in a product that is too highly condensed (i. e., the solution may gel as soon as cloudiness is evidenced) to meet the chief requirement of the present method, namely, that the condensation of the urea-formaldehyde reaction product in the suspension that is spray-dried to form a molding composition be slight enough so that the molding composition has a flow time of not more than 20 seconds under a pressure of 7,000 pounds per square inch in a cup mold heated by steam under 60 pounds gauge pressure, as hereinbefore discussed. The most convenient method for determining the proper degree of condensation in the aqueous solution is to carry the reaction to the point where the free formaldehyde is approximately 85 per cent of the original formaldehyde used. Free formaldehyde can be measured, of course, by adding sodium bisulfite to samples of the reaction mixture at various intervals and titrating for the amount of sodium hydroxide produced.

The time required to obtain the proper degree of condensation of the urea-formaldehyde reaction product varies with the pH of the solution, with the mol ratio of formaldehyde to urea and with the temperature. When the molar ratio of formaldehyde to urea is in the lower portion of the range, e. g., about 1 to 1.5 mols of formaldehyde per mol of urea, the reaction temperature may be as low as 10 degrees C. or as high as 60 degrees C., although it is preferable that it be not lower than 15 degrees C. and not higher than 50 degrees C. When the molar ratio of formaldehyde to urea is in the upper portion of the range, e. g., approaching 2 mols of formaldehyde per mol of urea, the reaction temperature should be at least 90 degrees C. in order that the reaction may not go so slowly that solids crystallize from the solution. However, the reaction temperature should not be higher than about 100 degrees C. in order to prevent the reaction from going so rapidly as to be uncontrollable.

The pH of the aqueous solution of urea and formaldehyde should be adjusted to within the range between 5.5 and 7.5 by addition of any desired base, such as triethanolamine or sodium hydroxide. When the pH is in the lower portion of this range, the reaction is more rapid and therefore is more difficult to control so that the lower temperatures hereinbefore described should be used. Similarly, the higher temperatures should be used when the pH is in the upper part of the range so that the reaction does not go too slowly. In general, by controlling these various factors, the reaction time may be made to range from 1 to 10 hours. Ordinarily, when the molar ratio of formaldehyde to urea is approximately 1.5:1, it is most convenient to adjust the pH between 6.5 and 7.0 and to carry out the reaction at a temperature between 20 and 30 degrees C. Under such conditions the reaction time is ordinarily about 4 hours, which allows sufficient time for the reaction to be readily controlled. When the urea and formaldehyde have been reacted to the desired degree, the solution may be neutralized to stabilize it until the spray-drying operation is carried out.

CELLULOSE FILLER

Various types of cellulose may be used, in finely divided form, as the filler in a molding composition of the invention produced by the present method. For example, cellulose materials which may be used include wood flour, paper pulp, newsprint, sawdust, walnut shell flour, ground corn cobs, regenerated cellulose, rice hulls and alpha cellulose. Of course, the filler must be sufficiently finely divided so that when it is mixed with the urea-formaldehyde reaction product, the resulting suspension is fine enough to pass through the spray nozzle during the spray-drying operation, as hereinafter further discussed. However, the size of the filler particles depends primarily upon the quality desired in the final composition. Thus, although any filler that can pass through a 60-mesh screen is finely divided enough to be used in a suspension which is to be spray-dried, in order to avoid a grainy appearance in the final molded articles, it may be desirable that the filler be finely divided enough to pass through a 200 to 325-mesh screen. Wood flour and walnut shell flour are examples of cellulose materials that are sufficiently finely divided to give molding compositions of good quality and appearance.

PRODUCTION OF MOLDING COMPOSITION

In the production of a molding composition of the invention by the present method, an aqueous suspension comprising a urea-formaldehyde reaction product, prepared as hereinbefore described, and a finely-divided cellulose filler, as hereinbefore described is spray-dried. It is preferable that the aqueous suspension be prepared by adding the cellulose filler after the urea and formaldehyde are reacted.

As hereinbefore discussed, the proportion of cellulose in the suspension is critical. When the proportion of filler is too low, the aqueous suspension cannot be spray-dried, and when the proportion of filler is too high, there is insufficient urea-formaldehyde resin to bind the filler into a coherent molding composition. In general, the proportion of filler may be as low as about 12.5 per cent of the mixture of filler and urea-formaldehyde reaction product (on a dry basis, as hereinafter explained), or as high as about 71 per cent of the mixture. It is preferable that it be from about 22 per cent to about 56 per cent of the mixture, and it is most desirable that it be from about 32 per cent to about 46 per cent of the mixture. (The terms "per cent" and "parts" are used herein to mean per cent and parts by weight unless otherwise specified.)

In calculating the proportion of the filler to be mixed with the urea-formaldehyde reaction product to form the suspension, the weight of the urea-formaldehyde reaction product is taken as the weight of methylol ureas. That is, for the sake of simplicity it is assumed that, using molar ratios within the ranges hereinbefore described, all the formaldehyde up to an amount equal to the weight of the urea has reacted to form methylol ureas, despite the fact that the condensation reaction usually is stopped when approximately only 85 per cent of the formaldehyde has reacted. Thus, if a solution of 45 grams of formaldehyde in 55 grams of water is reacted with 60 grams of urea, assuming that all of the formaldehyde reacts, the weight of urea-formaldehyde reaction product (i. e., the weight of methylol urea) is about 105 grams. Thus, if it is desired that the mixture of urea-formaldehyde reaction product and cellulose before spray-drying comprise 30 per cent cellulose, the weight of cellulose required is about 45 grams. Of course, in the final spray-dried molding composition this proportion of cellulose (based on the total weight of urea-formaldehyde condensation product and cellulose) is higher than 30 per cent. The urea-formaldehyde reaction product in the final composition has a reduced weight since it is the completely condensed product.

In order to spray-dry the mixture of finely-divided cellulose and urea-formaldehyde reaction product, it must contain sufficient water to form a suspension of sprayable consistency. In general, the amount of water may range from two to four times the weight of the urea-formaldehyde reaction product, depending upon the amount of cellulose.

Before spray-drying the aqueous suspension of the urea-formaldehyde reaction product and the cellulose filler, any of the customary additives for molding compositions may be incorporated. Such additives include plate lubricants, plasticizers, and curing catalysts of various types, the amount used in the case of each such additive being the usual amount consistent with its particular function in the molding composition. Usually, such additives may total from 0.1 to 1.0 per cent of the weight of the final dried molding composition. When coloring materials are added, inorganic pigments are preferred for better color stability.

Preliminary to spray-drying, the suspension should be agitated to insure complete dispersion. The pH of the aqueous suspension is then adjusted to 5–7, and preferably to 5.5–6.5 in order to accomplish the drying more easily. Drying may be effected in any type of spray-drying apparatus, the temperature required during the drying which should be just high enough to dry the material, depending, of course, upon the type of apparatus employed. When a drier of the type described in U. S. Patent No. 1,946,566, issued to William Spencer Bowen, is used, the temperature of the drying air as it is blasted past the atomized material may be from 370 to 470 degrees F. although it is preferable that it be from 390 to 425 degrees F. It is preferable that the temperature of the air carrying the spray-dried material to the collector be about 200 to 225 degrees F. to avoid stickiness of the material and clogging of the collector ducts. In the collector the material is very rapidly cooled to temperatures between 90 and 110 degrees F. before it is passed to the usual cooler, where it is cooled to room temperature (e. g., by means of water at 70 degrees F. jacketing the cooler).

During the spray-drying operation, the highly reactive urea-formaldehyde reaction product in the aqueous suspension is condensed to an advanced stage on the cellulose filler so that the resin solidifies in the drier and does not clog the outlet ducts. The resulting molding composition of the invention is an unusually dense, free-flowing powder that can be readily molded into articles having desirable appearance and water resistance.

The following examples illustrate the preparation of a molding composition of the invention by the present method.

*Example 1*

A mixture of urea (100 parts) and formalin (166 parts of a solution comprising 45 per cent formaldehyde and 55 per cent water) is heated at approximately 25 degrees C. As soon as the urea appears to be completely dissolved, the pH of the reaction mixture is adjusted to 6.5 to 7.0 with triethanolamine. The reaction is continued at 25 degrees C. until the free formaldehyde is approximately 5 to 7 per cent by weight of the mixture (determined by testing a sample of the mixture with sodium bisulfite as hereinbefore described). The resulting reaction product (100 parts) is mixed with wood flour (37 parts) and water (150 parts). Zinc stearate (1 part) is added as a plate lubricant and the mixture is then vigorously agitated to insure complete dispersion. The pH of the suspension is then adjusted to 6.0 with formic acid and the suspension is spray-dried in a Bowen spray drier at temperatures ranging between 390 and 410 degrees F., the collected product being cooled to room temperature as the final step in the drying operation. The final product is a dense, free-flowing powder. (When the procedure described above is repeated except that no filler is added to the urea-formaldehyde reaction product, and an attempt is made to spray-dry the solution, a tacky, gummy mass results.)

Samples of the molding composition obtained as described above (15 grams each) are pilled and molded into test pieces 2 inches in diameter and ⅛ inch thick under a pressure of 22,000 pounds per square inch of projected area for various periods of time (such as ½ minute, 1 minute, etc.), in a mold heated to about 309 degrees F. by steam. Some of the test pieces are weighed and are tested for cold water absorption by immersing them in water, held at about 25 degrees C., for 24 hours, drying them and reweighing. The gain in weight is a measure of the water resistance. (Water resistance varies with the amount of moisture that an article is capable of absorbing because the degree of deterioration upon exposure to moisture varies with the amount of moisture absorbed.) Other pieces are weighed and then tested for boiling water absorption by immersing in boiling water for 15 minutes, and then in water at room temperature for 5 minutes before drying them and reweighing. Table 1 below shows the per cent gain in weight of test pieces cured for various time intervals (column 1) and subjected to the cold water test (column 2) or the boiling water test (column 3).

TABLE 1

| Cure time (min.) | Percent Gain in Weight (cold water test) | Percent Gain in Weight (boiling water test) |
|---|---|---|
| ½ | 0.28 | 2.50 |
| 1 | 0.30 | 2.00 |
| 2 | 0.33 | 1.90 |
| 3 | 0.35 | 1.70 |
| 4 | 0.37 | 1.60 |
| 5 | 0.40 | 1.50 |

*Example 2*

A mixture of urea (100 parts) and formalin (221 parts of a solution comprising 45 per cent formaldehyde and 55 per cent water) is heated at approximately 90 to 100 degrees C. As soon as the urea appears to be completely dissolved, the pH of the reaction mixture is adjusted to 6.5 to 7.0 with triethanolamine. The reaction is continued at 90–100 degrees C. until the free formaldehyde is approximately 6 to 8 per cent by weight of the mixture (determined by testing a sample of the mixture with sodium bisulfite). The resulting reaction product (100 parts) is mixed with walnut shell flour (37 parts) and water (200 parts). Zinc stearate (1 part) is then added and the mixture is vigorously agitated to insure complete dispersion. The pH of the suspension is then adjusted to 6.0 with formic acid, and the suspension is spray-dried in a Bowen spray drier at temperatures ranging between 375 and 400 degrees F., the collected product being cooled to room temperature as the final step in the drying operation. The final product is a dense, free-flowing powder which can be readily molded into articles having desirable appearance and good water resistance.

Having described the invention, we claim:

1. A method of producing a molding composition that comprises reacting formaldehyde and urea in aqueous solution and forming an aqueous suspension which is sufficiently dilute to be sprayed and which comprises seven parts of the reaction product and one to seventeen parts of a finely divided cellulose filler, and then spray-drying said suspension at a pH of 5 to 7, the degree of condensation of the reaction product in the suspension being slight enough so that the final spray-dried molding composition has a flow time of not less than 5 nor more than 20 seconds under a pressure of 7,000 pounds per square inch in steel cup mold heated by steam under 60 pounds gauge pressure.

2. A method of producing a molding composition that comprises reacting formaldehyde and urea in aqueous solution and forming an aqueous suspension which is sufficiently dilute to be sprayed and which comprises seven parts of the reaction product and two to nine parts of a finely divided cellulose filler, and then spray-drying said suspension at a pH of 5 to 7, the degree of condensation of the reaction product in the suspension being slight enough so that the molding composition has a flow time of not less than 5 nor more than 15 seconds under a pressure of 7,000 pounds per square inch in a steel cup mold heated by steam under 60 pounds gauge pressure.

3. A method of producing a molding composition as claimed in claim 1 wherein the filler is added after the formaldehyde and urea are reacted.

4. A method of producing a dry, powdery molding composition that comprises reacting from 1.1 to 2.1 mols of formaldehyde with 1 mol of urea in aqueous solution to form an aqueous solution of a reaction product of a low degree of condensation, mixing the resulting solution of urea-formaldehyde reaction product with a 200 to 325 mesh wood flour filler in proportions of seven parts of reaction product to two to nine parts of said filler to form an aqueous suspension capable of being sprayed, and then spray-drying the said suspension at a pH of 5 to 7 to form a dry powdery molding composition, the degree of condensation of the said reaction product being low enough so that the final spray-dried molding composition has a flow time, under 7,000 pounds per square inch pressure in a steel cup mold heated by steam at 60 pounds gauge pressure, of not less than 5 nor more than 15 seconds.

5. The method of claim 2 in which the finely-divided cellulose filler is a 200 to 325 mesh walnut shell flour.

6. A method of producing a dry, powdery molding composition that comprises reacting from 1.1 to 2.1 mols of formaldehyde with 1 mol of urea in aqueous solution to form an aqueous solution of a reaction product of a low degree of condensation, mixing the resulting solution of urea-formaldehyde reaction product with a 200 to 325 mesh cellulose filler in proportions of seven parts of reaction product to two to nine parts of said filler and with about one part of zinc stearate mold lubricant per one-hundred parts reaction product to form an aqueous suspension capable of being sprayed, and then spray-drying the said suspension at a pH of 5 to 7 to form a dry powdery molding composition, the degree of condensation of the said reaction product being low enough so that the final spray-dried molding composition has a flow time, under 7,000 pounds per square inch pressure in a steel cup mold heated by steam at 60 pounds gauge pressure, of not less than 5 nor more than 15 seconds.

References Cited in the file of this patent

UNITED STATES PATENTS

| Number | Name | Date |
|---|---|---|
| 2,075,805 | Ellis | Apr. 6, 1937 |
| 2,140,561 | Smidth | Dec. 20, 1938 |
| 2,201,021 | Balz | May 14, 1940 |